United States Patent
Radzinski et al.

(10) Patent No.: US 7,423,386 B2
(45) Date of Patent: Sep. 9, 2008

(54) POWER SUPPLY CIRCUITS AND METHODS FOR SUPPLYING STABLE POWER TO CONTROL CIRCUITRY IN AN ELECTRONIC BALLAST

(75) Inventors: Christopher Radzinski, Huntsville, AL (US); Peter Shackle, Rolling Hills Estates, CA (US); Qinghong Yu, Salem, MA (US)

(73) Assignee: Universal Lighting Technologies, Inc., Madison, AL (US)

( * ) Notice: Subject to any disclaimer, the term of this patent is extended or adjusted under 35 U.S.C. 154(b) by 151 days.

(21) Appl. No.: 11/003,025

(22) Filed: Dec. 2, 2004

(65) Prior Publication Data

US 2005/0190586 A1    Sep. 1, 2005

Related U.S. Application Data

(60) Provisional application No. 60/526,640, filed on Dec. 3, 2003.

(51) Int. Cl.
*H05B 41/16* (2006.01)
*G05F 1/00* (2006.01)

(52) U.S. Cl. ........................................ 315/247; 315/307
(58) Field of Classification Search ................. 315/224, 315/291, 307, 209 R, 254, 262–264, 266, 315/247
See application file for complete search history.

(56) References Cited

U.S. PATENT DOCUMENTS

| | | | | |
|---|---|---|---|---|
| 5,925,990 A | | 7/1999 | Crouse et al. | ............... 315/307 |
| 5,936,357 A | * | 8/1999 | Crouse et al. | ............... 315/247 |
| 6,188,183 B1 | * | 2/2001 | Greenwood et al. | ......... 315/307 |
| 6,335,577 B1 | * | 1/2002 | Baba | ........................... 307/28 |
| 6,552,623 B2 | * | 4/2003 | Nishida et al. | ............. 331/111 |
| 7,015,652 B2 | * | 3/2006 | Shi | ............................. 315/224 |
| 2002/0180375 A1 | * | 12/2002 | Ku | ........................ 315/209 R |
| 2003/0067302 A1 | * | 4/2003 | St-Germain | ................. 324/500 |
| 2005/0093477 A1 | * | 5/2005 | Shi | ............................. 315/224 |

OTHER PUBLICATIONS

M.C. Cosby and R. M. Nelms, Designing a parallel-loaded resonant inverter for an electronic ballast using the fundamental approximation:, Conference Proceedings 8th Annual IEEE Applied Power Electronics Conference and Exposition, pp. 418-423, Mar. 1993.
U.S. Appl. No. 60/526,340, filed Dec. 3, 2003, by Chris Radzinski.

* cited by examiner

*Primary Examiner*—Douglas W. Owens
*Assistant Examiner*—Minh Dieu A
(74) *Attorney, Agent, or Firm*—Waddey & Patterson; Mark J. Patterson (57) ABSTRACT

Electronic ballast power supply/control circuits and methods that can be used to supply starting power to PFC control chips and that can be used to control ballasts so that PFC and inverter power supply circuits supply stable power to control circuitry even when the ballasts are performing advanced ballast functions. The circuits and methods supply starting power more quickly and efficiently than prior art starting circuits and control ballasts by either loading PFC circuits or inverter circuits included in the ballasts. The circuits load PFC circuits by connecting load resistors to the PFC circuits or by operating the inverter circuits at high frequencies that generate switching losses in the inverter transistors that load the PFC circuits. Inverter circuits are loaded by operating the inverter at frequencies that are much higher than preheating, igniting, and normal operating frequencies.

24 Claims, 4 Drawing Sheets

POWER SUPPLY CIRCUITS AND METHODS FOR SUPPLYING STABLE POWER TO CONTROL CIRCUITRY IN AN ELECTRONIC BALLAST

This application claims priority on U.S. Provisional Patent Application, Ser. No. 60/526,640, filed Dec. 3, 2003 and entitled "Low Loss Power Supply Management for Ballast with Microcontroller," which is hereby incorporated by reference.

APPLICATION FOR UNITED STATES LETTERS PATENT

A portion of the disclosure of this patent document contains material that is subject to copyright protection. The copyright owner has no objection to the facsimile reproduction by anyone of the patent document or the patent disclosure, as it appears in the Patent and Trademark office patent file or records, but otherwise reserves all copyright rights whatsoever.

Be it known that we, Qinghong Yu, a citizen of China, residing in Madison, Ala., Christopher Radzinski, a citizen of the United States, residing in Madison, Ala., and Peter W. Shackle, a citizen of the United States, residing in Madison, Ala., have invented new and useful "Power Supply Circuits And Methods For Supplying Stable Power To Control Circuitry In An Electronic Ballast."

BACKGROUND OF THE INVENTION

The present invention relates generally to electronic ballasts that include control circuitry.

More particularly, this invention pertains to power supply circuits and methods for supplying stable power to control circuitry included in electronic ballasts.

Electronic ballasts that include control circuitry are known in the art. These devices typically include an AC/DC converter circuit, a power factor control (PFC) circuit including a PFC control chip, an inverter circuit, which includes an inverter gate drive chip, and a microcontroller. The control circuitry includes the PFC control chip, the inverter gate drive chip, and the microcontroller. The lossless power supply management circuitry is designed to ensure that these chips receive appropriate bias supply at all times.

The AC/DC converter is designed to convert low frequency AC voltage from an AC power source into rectified AC voltage and the PFC circuit is designed to convert the rectified AC voltage into an approximately constant DC voltage and to cause power drawn from the AC power source to have a desired power factor. The inverter circuit is designed to convert the approximately constant DC voltage into high frequency sinusoidal AC voltage and to use that voltage to supply current to a gas discharge lamp connected to the electronic ballast. When the electronic ballast is operating normally, the inverter circuit loads the PFC circuit and the gas discharge lamp loads the inverter circuit.

The microcontroller is responsible for controlling the inverter circuit and causing it to generate the high frequency sinusoidal AC voltage supplied to the gas discharge lamp. In addition to controlling the inverter circuit, the microcontroller is also usually capable of automatically detecting and igniting lamps that are connected to the electronic ballast and protecting the electronic ballast and lamps from being damaged by fault conditions occurring in the electronic ballast.

The microcontroller, the PFC control chip, and the inverter gate drive chip included in the control circuitry of prior art electronic ballasts are all digital control circuits that have relatively strict power supply requirements. Unlike analog integrated circuits, which can continue to operate properly if their input voltage drops briefly, these digital circuits will not continue to operate properly if their input voltage drops too low. This is particularly true for the microcontroller, which will reset and restart as if the electronic ballast had just been turned on if its input voltage drops below a certain level.

The prior art teaches the use of three different types of power supply circuits and methods to supply power to control circuitry in electronic ballasts: the starting power supply circuit, the PFC power supply circuit, and the inverter power supply circuit. However using these circuits to provide power to the chips when the ballast is shut down either in response to a dimming off command or while waiting for a replacement lamp will either waste power or have other side effects such as producing undesired output voltages. In addition, the starting power supply circuit consumes unnecessary power, which reduces the efficiency of the ballast, and the alternative of limiting the amount of power consumed by it then causes electronic ballasts using this type of circuit to start slowly.

Figure 1:
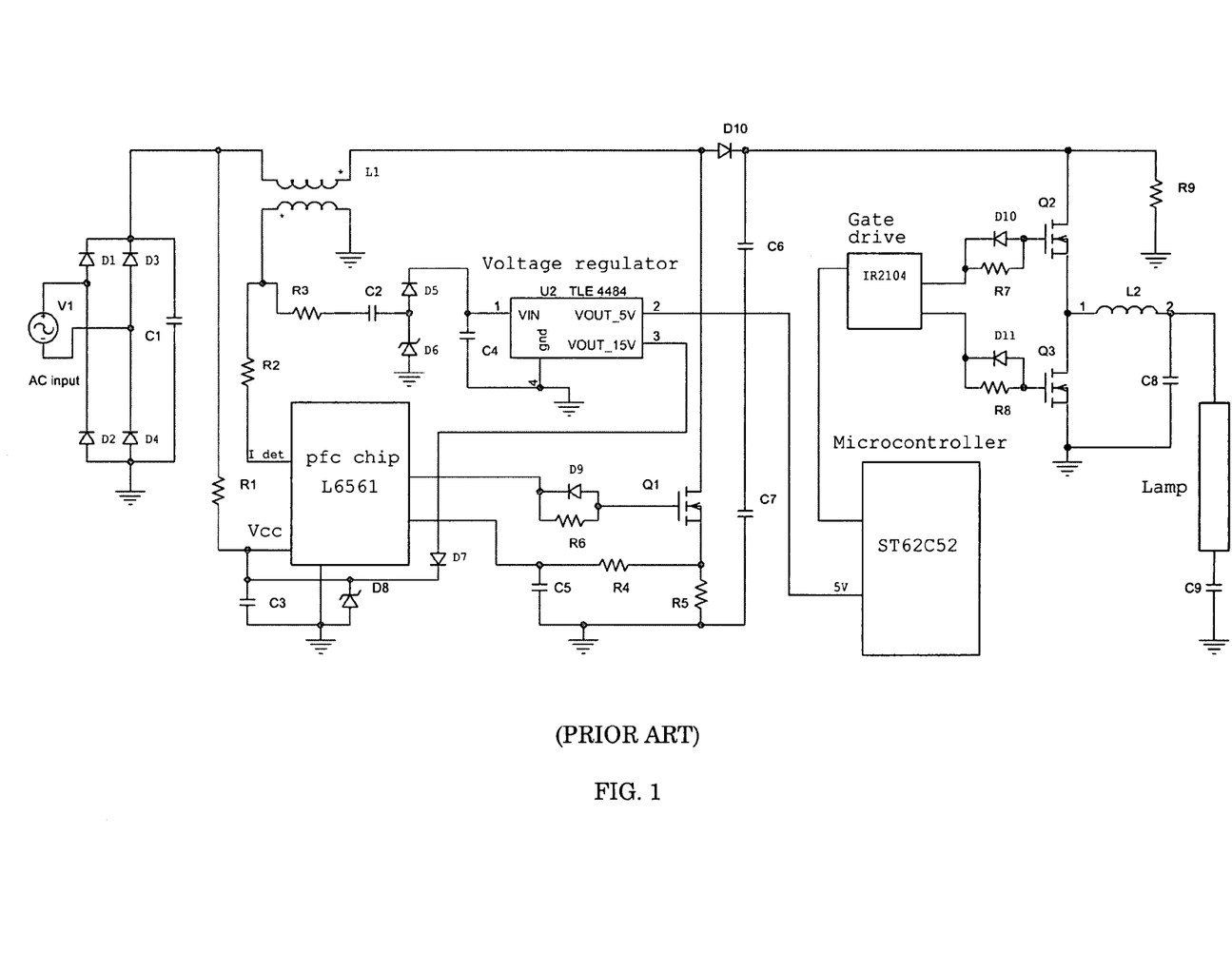
FIG. 1 is a simplified schematic of a prior art ballast with a microcontroller and active PFC stage.

An example of a prior art starting power supply circuit is shown in FIG. 1 supplying power to a PFC control chip and includes a resistor R1 connected to the high DC voltage input of the PFC circuit, a capacitor C3 connected to the resistor R1, a Zener diode D8 connected across the capacitor C3, and a blocking diode D7 connected to the Zener diode D8. The resistor R1 converts the high DC voltage input into a starting current that is supplied to the PFC control chip and used to charge the capacitor C3, which generates the required starting voltage for the PFC circuit. The Zener diode D8 prevents the starting voltage from exceeding a maximum starting voltage level and protects the PFC control chip from excessively high input voltages, and the blocking diode D7 prevents current from flowing back into the voltage regulator circuit included in the PFC power supply circuit.

Due to high power losses generated by the resistor R1, this type of circuit only provides a very small fraction of the power required by the control circuitry to operate properly and is typically only used to supply the PFC control chip with power until a PFC power supply circuit or an inverter power supply circuit can do so. In addition, once the PFC or the inverter power supply circuit begins supplying power to the PFC control chip, the starting power supply circuit continues to consume power even though it is no longer needed. This increases the amount of power consumed by, and reduces the efficiency of, electronic ballasts using this type of circuit. The high resistance of the resistor R1 also limits the amount of current that can flow in the circuit and increases the time required to start the PFC control chip.

An example of a prior art PFC power supply circuit is also shown in FIG. 1. This type of power supply circuit is widely used in the prior art and can be used to supply power to all of the electronic ballast control circuitry.

The PFC power supply circuit includes an auxiliary winding connected to a boost inductor L1, a charge pump connected to the auxiliary winding that includes R3, C2, D5, D6, and C4, and a voltage regulator circuit connected to the charge pump that includes the voltage regulator chip U2. The auxiliary winding generates and supplies a low voltage rectified AC voltage to the charge pump (the auxiliary winding is also used to provide zero current detection for transient mode operation of the PFC circuit), the charge pump uses this voltage to generate an input voltage that is supplied to the voltage regulator circuit, and the voltage regulator circuit uses the input voltage to generate and supply the required operating power to the control circuitry. More specifically, the voltage regulator circuit supplies a regulated +5 volt voltage to the microcontroller circuit and a +15 volt voltage to the PFC control chip and the inverter gate drive chip. The connection between the PFC power supply circuit and the inverter gate drive chip is not shown in FIG. 1 in order to simplify that drawing.

When the PFC circuit shown in FIG. 1 is operating normally, that is, it is converting the rectified AC voltage supplied by the AC/DC converter circuit into the approximately constant DC voltage that is supplied to the inverter circuit, the PFC power supply circuit is capable of generating and supplying the operating power required by the control circuitry in the electronic ballast. When the PFC circuit is not operating normally, however, the voltages generated by this type of power supply circuit drop out and cannot be used to supply the required operating power to the control circuitry. As explained in more detail below, this typically occurs when the inverter circuit is not loading, i.e., drawing current from, the PFC circuit.

The prior art solution to the problem presented by the PFC power supply circuit is to connect a load resistor (R9 in FIG. 1) across the bulk capacitors included with the PFC circuit. The load resistor provides a load to the PFC circuit and causes it to remain active even when the inverter circuit is not running. While this solution does work, it reduces the efficiency of, and generates extra heat in, the electronic ballast because the load resistor constantly consumes power. For a four-lamp ballast, the typical loss on the load resistor is approximately 2.7 watts.

Figure 4:
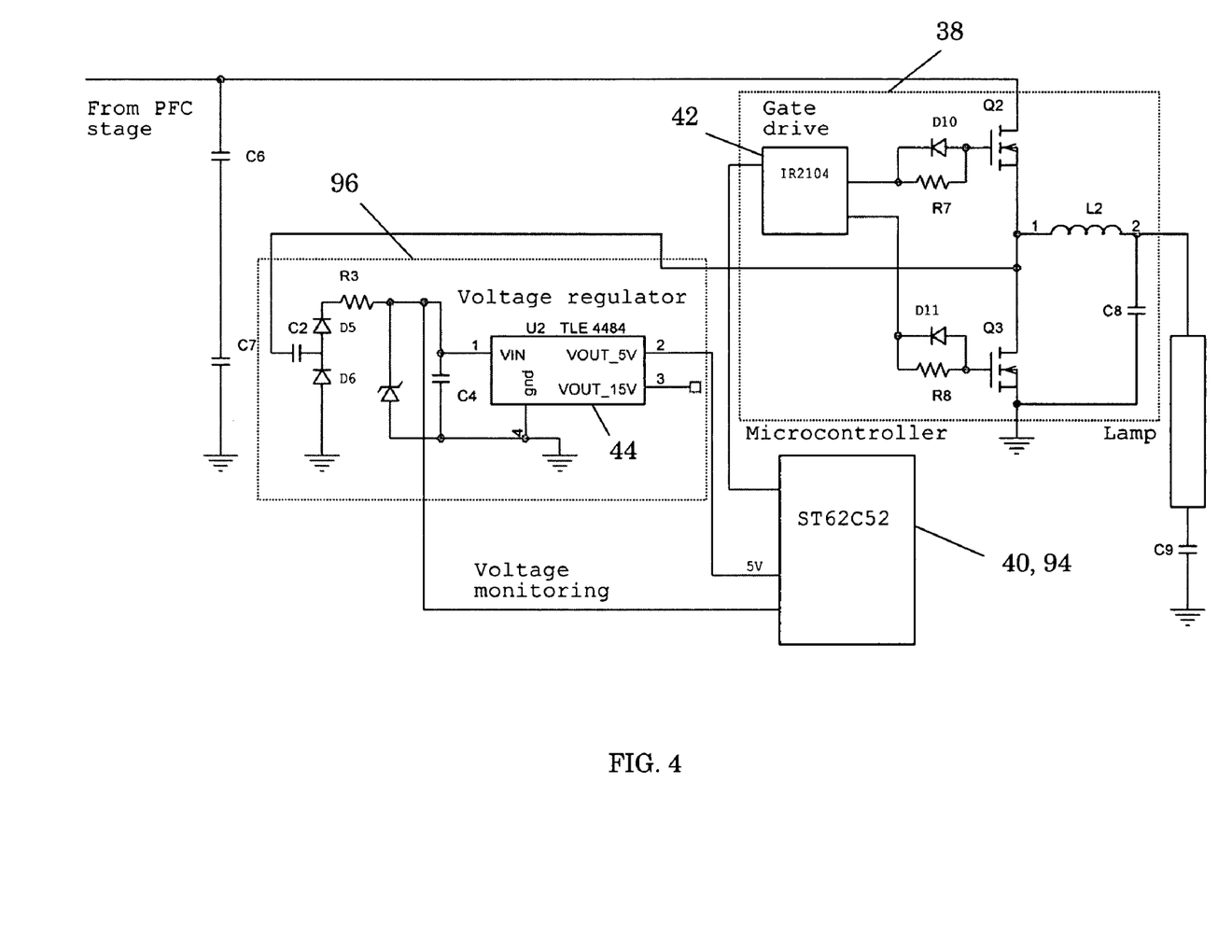
FIG. 4 is schematic showing another embodiment of the electronic ballast control circuit of the present invention.

An example of a prior art inverter power supply circuit is shown in FIG. 4. As shown in that figure, the inverter power supply circuit is connected to a midpoint between the two power MOSFET transistors included with the inverter circuit. The inverter power supply circuit includes a charge pump and a voltage regulator circuit, both of which are similar to the charge pump and voltage regulator circuits shown in FIG. 1. The inverter power supply circuit does not include the auxiliary winding connected to the boost inductor used with the PFC power supply circuit.

When the inverter circuit shown in FIG. 4 is operating normally and converting the approximately constant DC voltage supplied by the PFC circuit into high frequency sinusoidal AC voltage and current that is supplied to the gas discharge lamp, the inverter power supply circuit is capable of generating and supplying operating power to the control circuitry. If the inverter circuit stops running for some reason, this power supply stops as well and the required operating voltages for the control circuitry drop out. The prior art does not teach a solution for this problem.

As a result of the disadvantages discussed above, the PFC and inverter power supply circuits discussed above cannot be used to supply stable power in an electronic ballast that includes a microcontroller that provides advanced functions which require prolonged periods of inactivity, such as when the ballast has shut down because a lamp has reached end of life and the ballast is waiting for relamping. When the microcontroller in this type of electronic ballast senses that the ballast has been connected to a gas discharge lamp, it automatically causes the inverter circuit to attempt to ignite the lamp by turning the inverter circuit off and on for brief periods of time, i.e., flashing the lamp. More specifically, the microcontroller turns the inverter circuit off and on every two seconds for a 100 second time period causing the lamp to flash 50 times. During each 2 second time interval, the inverter circuit is on for approximately 10 milliseconds and off for the remainder of the interval. The duration of the flashes and the intervals between flashes are set by industrial regulations, such as Underwriters Laboratories (UL) regulation UL 935, and are designed to prevent the electronic ballast from presenting an electric shock hazard to a human being.

Unfortunately, the limitations on the flashing duration and interval make it impossible to feed current from the inverter circuit to the lamp during the flashing period. As a result, the inverter circuit turns off and no longer loads the bulk capacitors included in the PFC circuit. This, in turn, causes the PFC circuit to turn off.

When the inverter circuit turns off, the charge pump in the inverter power supply circuit turns off and the voltages generated by the inverter power supply circuit drop too low to be used to supply the required voltages to the control circuitry in the electronic ballast. In a similar manner, when the PFC circuit turns off, the charge pump in the PFC power supply circuit turns off and the voltages generated by the PFC power supply circuit drop too low to be used to supply power to the electronic ballast control circuitry. Thus, neither of these types of power supply circuits can be used in electronic ballasts providing this type of advanced functionality.

What is needed, then, is a starting power supply circuit and method that can be used to supply starting power to a PFC control chip in an electronic ballast more quickly and that consumes less power and is more efficient than prior art starting power supply circuits. In addition, what is needed is PFC and inverter power supply circuits and methods that can be used to supply stable power to the control circuitry even when the ballast output is completely shut down.

SUMMARY OF THE INVENTION

Accordingly, one object of the present invention is to provide a starting power supply circuit and method that can be used to supply starting power to a PFC control chip in an electronic ballast more quickly and that consumes less power and is more efficient than prior art starting power supply circuits and methods.

Another object is to provide PFC and inverter power supply circuits and methods that can be used to supply stable power to the control circuitry even when the microcontroller is performing advanced functions, such as automatic lamp detection and relamping.

Still another object is to provide a PFC power supply circuit and method that can be used to supply stable power to the control circuitry even when the microcontroller is performing advanced functions and that is more efficient than the prior art method of connecting a load resistor to the PFC circuit.

These objects, and other objects that will become apparent to one skilled in the art practicing the present invention, are satisfied by the electronic ballast power supply circuits and methods of the present invention.

According to one aspect, the present invention includes an electronic ballast power supply and control circuit that can be used to supply starting power to a PFC control chip in an electronic ballast and that can be used to control the electronic ballast so that an operating power supply circuit in the electronic ballast supplies stable operating power to the PFC control chip and other control circuitry included in the electronic ballast even when an inverter circuit included in the electronic ballast is not loading a PFC circuit included in the electronic ballast. The power supply and control circuit includes a starting power supply/loading circuit adapted to be connected to the PFC circuit and to the PFC control chip, and to convert power supplied by the PFC circuit into starting power for the PFC control chip and to supply the starting power to the PFC control chip.

The power supply and control circuit also includes a control circuit connected to the starting power supply/loading circuit and adapted to be connected to the operating power supply circuit and the PFC control chip. The control circuit is also adapted to sense when the operating power supply circuit begins supplying stable operating power to the PFC control chip and to disconnect the starting power supply/loading circuit from the PFC control chip so that the starting power supply/loading circuit no longer supplies starting power to the PFC control chip. In addition, the control circuit is adapted to sense when the inverter circuit stops loading the PFC circuit and, in response, to connect the starting power supply/loading circuit to the PFC circuit in a manner that causes the PFC circuit to supply the operating power supply circuit with sufficient power to prevent the operating power being supplied by the operating power supply circuit to the PFC control chip and the other control circuitry from becoming unstable. Finally, the control circuit is further adapted to sense when the inverter circuit begins loading the PFC circuit again and, in response, to disconnect the starting power supply/loading circuit from the PFC circuit.

According to a second aspect, the present invention includes a method of supplying stable power to a PFC control chip and other control circuitry in an electronic ballast using a starting power supply/loading circuit that includes the steps of connecting the starting power supply/loading circuit to the PFC control chip, converting power supplied by a PFC circuit in the electronic ballast into starting power and supplying the starting power to the PFC control chip using the starting power supply/loading circuit, sensing when an operating power supply circuit in the electronic ballast begins supplying stable operating power to the PFC control chip, and disconnecting the starting power supply/loading circuit from the PFC control chip so that the starting power supply/loading circuit no longer supplies starting power to the PFC control chip when the operating power supply circuit begins supplying stable operating power to the PFC control chip. The method further includes the steps of sensing when an inverter circuit included in the electronic ballast stops loading the PFC circuit, connecting the starting power supply/loading circuit to the PFC circuit in a manner that causes the PFC circuit to supply the operating power supply circuit with sufficient power to prevent the operating power being supplied by the operating power supply circuit to the PFC control chip and the other control circuitry from becoming unstable when the inverter circuit stops loading the PFC circuit, sensing when the inverter circuit begins loading the PFC circuit again, and disconnecting the starting power supply/loading circuit from the PFC circuit when the inverter circuit begins loading the PFC circuit again.

A third aspect of the present invention includes an electronic ballast control circuit that can be used to control an electronic ballast so that an operating power supply circuit in the electronic ballast supplies stable operating power to control circuitry in the electronic ballast. The control circuit includes a controllable load circuit adapted to be connected to a PFC circuit included in the electronic ballast and to load the PFC circuit so that the PFC circuit supplies the operating power supply circuit with sufficient power to supply the control circuitry with stable operating power. The control circuit further includes a load control circuit connected to the load circuit and adapted to sense when an inverter circuit included in the electronic ballast stops loading the PFC circuit and, before the stable operating power being supplied by the operating power supply circuit can become unstable as a result of the inverter circuit not loading the PFC circuit, to connect the controllable load circuit to the PFC circuit so that the controllable load circuit loads the PFC circuit and causes the PFC circuit to supply the operating power supply circuit with sufficient power to prevent the stable operating power being supplied by the operating power supply circuit from becoming unstable. When the inverter circuit begins loading the PFC circuit again, the load control circuit senses this change and, in response, disconnects the controllable load circuit from the PFC circuit.

Still another aspect of the present invention includes a method of supplying stable power to control circuitry in an electronic ballast that includes the steps of sensing when an inverter circuit in the electronic ballast stops loading a PFC circuit in the electronic ballast and, in response, loading the PFC circuit so that the PFC circuit supplies an operating power supply circuit in the electronic ballast with sufficient power to supply the control circuitry with stable operating power. This method also includes the steps of sensing when the inverter circuit begins loading the PFC circuit again and, in response, unloading the PFC circuit.

A fifth aspect of the present invention includes an electronic ballast control circuit that can be used to control an electronic ballast so that an operating power supply circuit in the electronic ballast supplies stable operating power to control circuitry in the electronic ballast. This control circuit includes a microcontroller adapted to be connected to the operating power supply circuit and an inverter circuit in the electronic ballast. The microcontroller is further adapted to sense when a lamp connected to the electronic ballast stops loading the inverter circuit and, in response, to load the inverter circuit in a manner that causes the inverter circuit to supply the operating power supply circuit with sufficient power to supply the control circuitry with stable operating power and that prevents the inverter circuit from supplying a lamp output included with the electronic ballast with sufficient power to create an electric shock hazard to humans. The microcontroller is still further adapted to unload the inverter circuit when the microcontroller senses that the lamp is beginning to load the inverter circuit again.

According to a sixth aspect, the present invention includes a method of supplying stable operating power to control circuitry in an electronic ballast that includes the steps of sensing when a lamp connected to the electronic ballast stops loading an inverter circuit included in the electronic ballast and, in response, loading the inverter circuit in a manner that causes the inverter circuit to supply an operating power supply circuit in the electronic ballast with sufficient power to supply the control circuitry with stable operating power and that prevents the inverter circuit from supplying a lamp output included with the electronic ballast with sufficient power to create an electric shock hazard to humans. In addition, this method also includes the steps of sensing when the lamp begins loading the inverter circuit again and, in response, unloading the inverter circuit.

According to still another aspect, the present invention includes a power resistor which connects from one of the high voltage power nodes of the ballast through an electronic switch to an auxiliary power rail of the system which provides power for the integrated circuits present. If the voltage on the auxiliary power rail falls below the desired level then the switch is briefly closed until the desired voltage is achieved. The loading of the boost stage achieved by connecting the resistor prompts the boost to start up and supply power to the auxiliary power rail, and in addition the charge which is being removed from the high voltage power rail is being deposited directly into the auxiliary power rail

DESCRIPTION OF THE PREFERRED EMBODIMENTS

Figure 2:
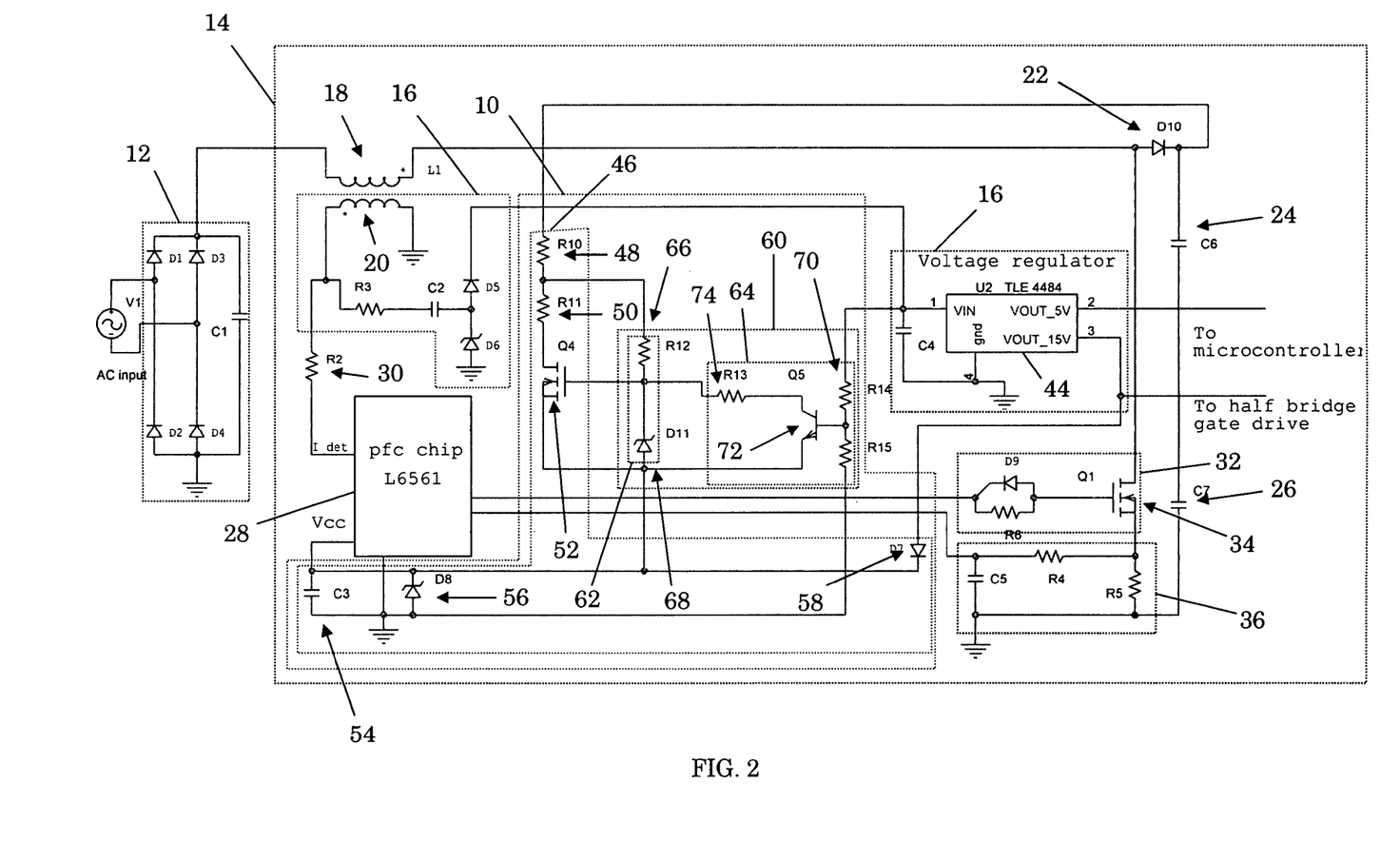
FIG. 2 is a schematic showing one embodiment of the electronic ballast power supply and control circuit of the present invention.

Referring to FIG. 2, one embodiment of the electronic ballast power supply and control circuit 10 of the present invention is shown connected to a conventional electronic ballast. The electronic ballast includes an AC/DC converter circuit 12, a PFC circuit 14, and a PFC power supply circuit 16. The AC/DC converter circuit 12 is a conventional AC/DC converter circuit and is operable to convert AC input voltage provided by an AC power source into rectified AC voltage. The AC/DC converter circuit 12 includes a full bridge rectifier, which converts the AC input voltage into the rectified AC voltage, and a filter capacitor, which prevents high frequency switching noise created by switching in the PFC circuit 14 from being passing back through the AC/DC converter circuit 12 to the AC voltage source.

The PFC circuit 14 is a conventional PFC circuit and is operable to convert rectified AC voltage supplied by the AC/DC converter circuit 12 into approximately constant DC voltage and to cause power drawn from the AC power source to have a desired power factor. The PFC circuit 14 includes a PFC boost inductor 18 with an auxiliary winding 20, a boost diode 22, two bulk capacitors 24, 26, a PFC control chip 28, a zero current detection resistor 30, a PFC transistor circuit 32, which includes a PFC transistor 34, a gate resistor, and a gate diode, and a current sensing circuit 36, which includes a current sense resistor and a low pass filter circuit. The low pass filter circuit includes a low pass resistor connected to a low pass capacitor. The connection between the boost diode 22 and an inverter circuit (not shown in FIG. 2, but see FIG. 3) is referred to as a high voltage rail.

Figure 3:
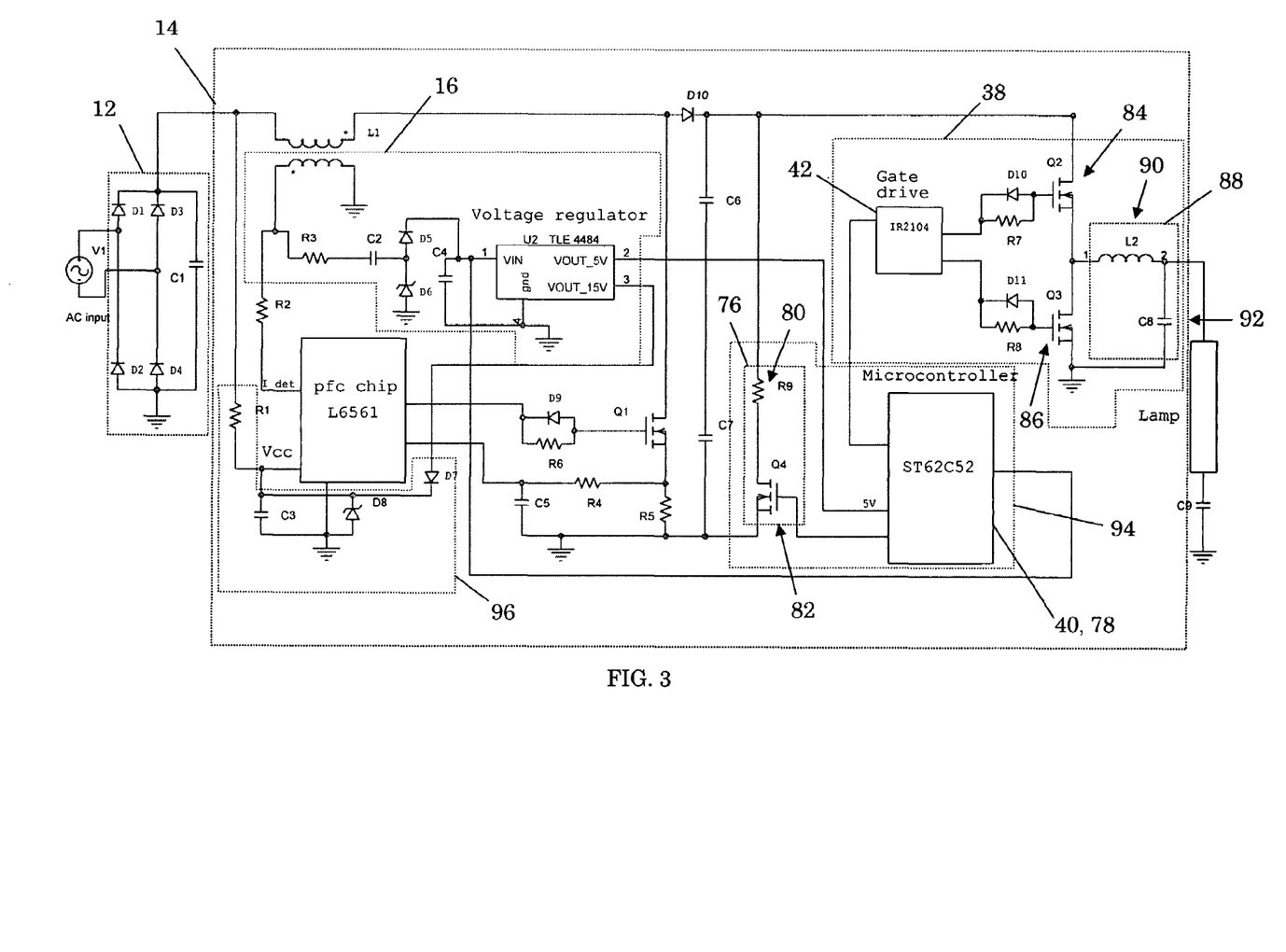
FIG. 3 is a schematic showing one embodiment of the electronic ballast control circuit of the present invention.

The PFC circuit 14 also includes an output voltage sensing circuit (not shown) that is used to sense the DC voltage that develops across the bulk capacitors 24, 26 and to send a voltage feedback signal representative of this voltage back to the PFC control chip 28. The PFC control chip 28 uses this feedback signal to adjust the operation of the PFC circuit 14 so that the DC voltage developed across the bulk capacitors 24, 26 remains approximately constant. When an inverter circuit 38 (an example of which is shown in FIG. 3) draws current from the bulk capacitors 24, 26, the DC voltage across these capacitors begins to drop. The PFC control chip 28 senses this drop and increases the switching of the PFC transistor 34 to prevent the voltage from dropping to low. In addition, when the inverter circuit 38 is not drawing current from the bulk capacitors 24, 26, the DC voltage across the bulk capacitors 24, 26 remains approximately constant. The PFC control chip 28 senses this fact as well and stops switching the PFC transistor 34 so that the DC voltage does not rise above a desired maximum value.

The PFC power supply circuit 16 is a conventional PFC power supply circuit that is operable to convert a low voltage, rectified AC voltage ("the LV rectified AC voltage") that develops across the auxiliary winding 20 connected to the PFC boost inductor 18 into low voltage, voltage regulated, DC voltages ("the LVVR DC voltages") that can be supplied to the PFC control chip 28, a microcontroller 40 (not shown in FIG. 2, but see FIG. 3), and a half bridge gate drive chip 42 (not shown in FIG. 2, but see FIG. 3). In FIG. 2, the LVVR DC voltages are +5 and +15 volt DC voltages. The +5 volt DC voltage is supplied to the microcontroller 40 and the +15 volt voltage is supplied to both the PFC control chip 28 and the half bridge gate drive 42.

The PFC power supply circuit 16 includes a charge pump, which converts the LV rectified AC voltage into a low voltage DC input voltage ("the LV DC input voltage"), and a voltage regulator chip 44, which converts the LV DC input voltage into the LVVR DC voltages (in alternative embodiments the voltage regulator chip may be replaced with a voltage regulating Zener diode instead). The charge pump includes a charge pump resistor, a charge pump input capacitor, a charge pump Zener diode, a charge pump diode, and a charge pump output capacitor. The connection between the charge pump diode and the charge pump output capacitor is referred to as a low voltage rail.

The LV rectified AC voltage only develops across the auxiliary winding 20 when the PFC transistor 34 is switched off and on by the PFC control chip 28. In other words, the LV rectified AC voltage only develops when the PFC circuit 14 is operating normally. When the PFC circuit 14 stops operating, the LV rectified AC voltage is not developed across the auxiliary winding 20 and cannot be converted into the LVVR DC output voltages.

The electronic ballast power supply and control circuit 10 is operable to supply the PFC control chip 28 with starting and operating power until the PFC power supply circuit 16 begins operating properly. Once the PFC power supply circuit 16 begins supplying power, the electronic ballast power supply and control circuit 10 stops supplying power to the PFC control chip 28. Importantly, and unlike prior art starting circuits, the electronic ballast power supply and control circuit 10 of the present invention also reduces the amount of power consumed by the electronic ballast power supply and control circuit 10 after the PFC power supply circuit 16 begins supplying power to the PFC control chip 28. As a result, the electronic ballast power supply and control circuit 10 of the present invention consumes less power and is more efficient than prior art starting circuits.

To supply starting and operating power to the PFC control chip 28, the electronic ballast power supply and control circuit 10 includes a starting power supply/loading circuit 46 that is operable to convert the rectified AC voltage supplied by the AC/DC converter circuit 12 into starting and operating power for the PFC control chip 28. The starting power supply/loading circuit 46 includes two starting/loading resistors 48, 50, a starting/loading transistor 52, a starting capacitor 54, a starting Zener diode 56, and a blocking diode 58.

The starting/loading resistors 48, 50 are connected to the output of the PFC circuit 14 and, more particularly, to the boost diode 22 and the bulk capacitors 24, 26 in the PFC circuit 14, and in series with the starting/loading transistor 52. The starting capacitor 54 and starting Zener 56 are connected in parallel with one another, to the PFC control chip 28, to circuit ground, and in series with the starting/loading transistor 52. The blocking diode 58 is connected to the starting capacitor 54 and the starting Zener 56, the PFC control chip 28, and the +15 volt output of the voltage regulator chip 44 in the PFC power supply circuit 16. The connection between the blocking diode 58 and the PFC control chip 28 is referred to as an auxiliary power supply rail.

The starting/loading resistors 48, 50 limit the starting and operating current flowing to the PFC control chip 28 and prevent those currents from reaching levels that can damage the PFC control chip 28. The starting/loading transistor 52 is operable to connect and disconnect the starting/loading resistors 48, 50 from the PFC control chip 28 based on control voltages received from a control circuit discussed in more detail below. The starting capacitor 54 is operable to convert the starting and operating currents into starting and operating voltages, respectively, for the PFC control chip 28. The starting Zener diode 56 is operable to limit the starting and operating voltages to levels that will not harm the PFC control chip 28. The blocking diode 58 prevents starting and operating current from flowing into the +15 volt output of the voltage regulator chip 44 in the PFC power supply circuit 16.

To determine when to supply power to the PFC control chip 28, the electronic ballast power supply and control circuit 10 includes a control circuit 60 that is operable to sense when the PFC power supply circuit 16 is and is not supplying power to the PFC control chip 28. When the control circuit 60 senses that the PFC power supply circuit 16 is not supplying power, the control circuit 60 connects the starting power supply/loading circuit 46 to the PFC control chip 28 so that it can supply starting and operating power to the PFC control chip 28. Similarly, when the control circuit 60 senses that the PFC power supply circuit 16 is supplying power to the PFC control chip 28, the control circuit 60 disconnects the starting power supply/loading circuit 46 from the PFC control chip 28. The control circuit 60 includes a starting/loading connecting circuit 62 ("the connecting circuit 62") and a starting/loading disconnecting circuit 64 ("the disconnecting circuit 64") for performing these functions.

The connecting circuit 62 is connected to the output of the PFC circuit 14, and more specifically, to the boost diode 22 in the PFC circuit 14, (it could be connected to other high voltage nodes as well, for example the rectified ac power line voltage at the input) and is operable to convert the rectified AC voltage generated by the AC/DC converter circuit 12 into a starting/loading transistor turn on voltage and to supply this voltage to the starting/loading transistor 52. In response to this voltage, the starting/loading transistor 52 turns on and connects the starting/loading resistors 48, 50 to the PFC control chip 28, the starting capacitor 54, the starting Zener 56, and the blocking diode 58, and the starting power supply/loading circuit 46 supplies power to the PFC control chip 28. The power drain from the rail drops the rail voltage a little, stimulating the PFC to run and generate power for the ⁵⁄₁₅V regulator 44 and the other chips in the system. As an alternative to this configuration, the charge bled off from the power rail could also be delivered to the input pin 1 of the voltage regulator 44, with a suitably different switching control circuit.

The connecting circuit 62 includes a connecting resistor 66 connected in series with a connecting Zener diode 68. The connecting resistor 66 is connected to a point between the two starting/loading resistors 48, 50 and to the gate of the starting/loading transistor 52. The connecting Zener 68 is connected to the connecting resistor 66, the gate of the starting/loading transistor 52, the drain of the starting/loading transistor 52, the blocking diode 58, the starting Zener 56, the starting capacitor 54, and the PFC control chip 28.

The disconnecting circuit 64 is connected to the LV DC input voltage input of the voltage regulator chip 44 and is operable to convert the LV DC input voltage applied to this input into a starting/loading transistor turn off voltage and to supply this voltage to the starting/loading transistor 52. In response to this voltage, the starting/loading transistor 52 turns off and disconnects the starting/loading resistors 48, 50 from the PFC control chip 28, the starting capacitor 54, the starting Zener 56, and the blocking diode 58.

The disconnecting circuit 64 only generates the starting/loading transistor turn off voltage when the LV DC input voltage applied to the voltage regulator chip 44 rises above a minimum LV DC input voltage level that can be converted by the voltage regulator chip 44 into the power required by the PFC control chip 28 to operate properly. Prior to this time, the voltage regulator chip 44 cannot supply the PFC control chip 28 with sufficient power to operate properly and the starting power supply/loading circuit 46 must be used to supply power to the PFC control chip 28.

The disconnecting circuit 64 includes a disconnecting voltage divider 70, a disconnecting transistor 72, and a disconnecting resistor 74. The disconnecting voltage divider 70 is connected to the LV DC input voltage input of the voltage regulator chip 44 and to circuit ground, and includes two voltage divider resistors. The disconnecting transistor 72 includes a base connected to a point between the two voltage divider resistors, a collector connected to the disconnecting resistor 74, and an emitter connected to the connecting Zener diode 68, the blocking diode 58, the starting Zener 56, the starting capacitor 54, and the PFC control chip 28. The disconnecting resistor 74 is connected to the connecting resistor 66, the gate of the starting transistor, and the connecting Zener diode 68.

The disconnecting voltage divider 70 converts the LV DC input voltage applied to the voltage regulator chip 44 into a disconnecting control voltage that can be used to turn the disconnecting transistor 72 on and off. When the LV DC input voltage is below the minimum LV DC input voltage level that can be converted by the voltage regulator chip 44 into the power required by the PFC control chip 28 to operate properly, the disconnecting control voltage developed across the disconnecting voltage divider 70 is too small to turn the disconnecting transistor 72 on. As a result, the connecting circuit 62 generates and supplies the starting/loading transistor turn on voltage to the starting/loading transistor 52 and the starting/loading transistor 52 stays on.

When the LV DC input voltage rises below the minimum LV DC input voltage level, the disconnecting voltage divider 70 generates a disconnecting control voltage that causes the disconnecting transistor 72 to turn on. When this happens, the disconnecting resistor 74 connects in parallel with the connecting Zener diode 68 and causes the starting/loading transistor turn on voltage to drop below a level that causes the starting/loading transistor 72 to turn on. This, in turn, causes the starting/loading transistor 52 to turn off and disconnect the starting/loading resistors 48, 50 from the PFC control chip 28, the starting capacitor 54, the starting Zener 56, and the blocking diode 58. As a result, power is no longer supplied to the PFC control chip 28 by the electronic ballast power supply and control circuit 10.

It should be noted that the connecting circuit 62 does consume power after the starting power supply/loading circuit 46 is disconnected from the PFC control chip 28. By sizing the connecting resistor 66 so that the current flowing through the connecting circuit 62 is very small, i.e., by choosing a connecting resistor 66 that has a large resistance, the amount of power dissipated in the connecting circuit 62 can be minimized and reduced to a level that is lower than the power consumed by prior art starting circuits that are constantly connected to the PFC control chip 28. This causes the starting power supply/loading circuit 46 of the present invention to be more efficient than constantly connected prior art starting circuits. In addition, by selecting starting/loading resistors

48, 50 that have a very small resistance, the electronic ballast power supply and control circuit 10 can be designed so that it generates and supplies the starting power required by the PFC control chip 28 more quickly than prior art starting circuits.

The electronic ballast power supply and control circuit 10 is also operable to regulate the operation of the PFC circuit 14 so that the LVVR DC voltages generated by the PFC power supply circuit 16 remain approximately constant even when an inverter circuit 38 (such as the one shown in FIG. 3) is not loading the PFC circuit 14. To perform this function, the electronic ballast power supply and control circuit 10 senses when the inverter circuit 38 is not loading the PFC circuit 14 and, in response, loads the PFC circuit 14 so that it supplies the PFC power supply circuit 16 with sufficient voltage to generate the required LVVR DC voltages. When the electronic ballast power supply and control circuit 10 senses that the inverter circuit 38 is once again loading the PFC circuit 14 in a manner that allows the PFC power supply circuit 16 to supply the required LVVR DC voltages, the circuit stops loading the PFC circuit 14.

By loading and unloading the PFC circuit 14 in this manner, the electronic ballast power supply and control circuit 10 of the present invention consumes less power than prior art load circuits that constantly load the PFC circuit 14 and consume power. This causes electronic ballasts using the electronic ballast power supply and control circuit 10 of the present invention to be more efficient than prior art electronic ballasts using load circuits that constantly load the PFC circuit 14.

Turning now to FIG. 3, one embodiment of the electronic ballast control circuit 94 of the present invention is shown connected to a conventional electronic ballast similar to the one shown in FIG. 2. In this case the microprocessor, which includes an A/D circuit for measuring voltage, is used to directly measure the voltage on pin 1 of the voltage regulator and uses one of its output pins to directly drive the FET 82. All other aspects of the operation are unchanged.

In a variation of the embodiment shown in FIG. 3, the microcontroller 40 does not sense the LV DC input voltage supplied to the voltage regulator chip 44 in the PFC power supply circuit 16. Instead, the microcontroller 40 simply monitors itself to determine if it is sending control signals to the inverter circuit 38 that cause the inverter circuit 38 to load the PFC control chip 28, i.e., the microcontroller 40 simply senses if the inverter circuit 38 is running. If not, the microcontroller 40 generates a control signal that causes the load transistor 82 to turn on and connect the load resistor 80 to circuit ground. When the microcontroller 40 begins generating control signals that cause the inverter circuit 38 to begin loading the PFC circuit 14 again, the microcontroller 40 generates a control signal that causes the load transistor 82 to turn off and disconnect the load resistor 80 from circuit ground.

The circuit shown in FIG. 3 and described above is an alternative method for providing the load to the PFC circuit 14 in which the load transistor 82 is directly controlled by the microcontroller 40. The microcontroller 40 turns on the load transistor 82 to provide a load to the PFC circuit 14 when the inverter is not running or when it detects that the low voltage power supply is dropping off.

Although the circuits shown in FIGS. 2 and 3 work as indicated above, they do require the use of high voltage transistors. This may be undesirable in some applications. Accordingly, in another variation of the embodiment shown in FIG. 3, the controllable load circuit 76 is excluded and the microcontroller 40 is modified to include software that causes the microcontroller 40 to switch the inverter transistors 84, 86 at a switching frequency that generates switching losses in the inverter transistors 84, 86. These losses load the PFC circuit 14 and prevent the LV DC input voltage to the voltage regulator 44 from dropping below the minimum LV DC input voltage level that can be converted into the LVVR DC voltages required by the electronic ballast control circuitry.

In this embodiment, the microcontroller 40 senses the LV DC input voltage supplied to the voltage regulator chip 44 included in the PFC power supply circuit 16 and, when this voltage drops below the LV DC voltage level generated when the inverter circuit 38 is loading the PFC circuit 14, the microcontroller 40 generates control signals that cause the inverter gate drive 42 to switch the inverter transistors 84, 86 on and off at a switching frequency that causes switching losses to develop in the inverter transistors 84, 86. When the LV DC input voltage rises back above the LV DC voltage level generated when the inverter circuit 38 is loading the PFC circuit 14, the microcontroller 40 stops generating controls signals that cause switching losses to develop in the inverter transistors 84, 86.

In alternative embodiments, the microcontroller 40 does not sense the LV DC input voltage supplied to the voltage regulator chip 44 in the PFC power supply circuit 16. Instead, the microcontroller 40 simply monitors itself to determine if it is sending control signals to the inverter circuit 38 that cause the inverter circuit 38 to load the PFC control chip 28. If not, it generates control signals that cause the inverter circuit 38 to operate at a switching frequency that causes switching losses in the inverter transistors 84, 86. When the microcontroller 40 begins generating control signals that cause the inverter circuit 38 to begin loading the PFC circuit 14 again, the microcontroller 40 stops generating the control signals that cause switching losses to develop in the inverter transistors 84, 86.

Loading the PFC circuit 14 by creating switching losses in the inverter transistors 84, 86 is possible because the resonant output circuit 88 of the inverter circuit 38, which includes resonant output inductor 90 and capacitor 92, provides a high impedance when the inverter frequency is much higher, for example, more than approximately 200 kHz, than the resonant frequency of the resonant output circuit 88. When the inverter circuit 38 is operating at this frequency, the voltage developed across the resonant output circuit capacitor 92 is very small and there is no electric shock risk to human beings.

When the ballast is shut down or merely flashing a lamp, and the low voltage power supply begins to drop off, the microcontroller 40 can operate the inverter circuit 38 in between flashes at a frequency that is much higher than normal in order to create losses in the inverter switches 84, 86. With the power supply voltage monitored, this high frequency running of the inverter is controlled to avoid excessive stress on the inverter switches 84, 86, while simultaneously creating enough load on the output of the PFC circuit 14 to activate it to provide enough power to the PFC power supply circuit 16.

Such a mode of operation is shown in FIG. 4. In this embodiment when the ballast is temporarily shut down, the microprocessor simply turns on the output at a harmless but power dissipating high frequency in order to load the boost stage and cause it to run and generate bias power for the chips.

The output stage can also be used to generate bias power for the chips directly, and this is the particular configuration shown in FIG. 4. Instead of the controlled loading of the PFC circuit 14 discussed above, this embodiment uses a charge pump approach that is implemented using software that causes the inverter circuit 38 to operate at a very high frequency that prevents voltage high enough to present an electric shock hazard from developing on the resonant output circuit capacitor. In this embodiment, the charge pump should be connected to the inverter circuit 38 as shown in FIG. 4.

The inverter power supply circuit shown in FIG. 4 is the same type of circuit that is typically used in the prior art and connected to an inverter circuit 38 in an electronic ballast. In this case, however, the power supply is secured mainly by software. When the inverter circuit 38 is not running at preheating, lamp ignition, or normal operating frequencies, and the lamp cannot be the load of the inverter circuit 38, software in the microcontroller 40 causes the microcontroller 40 to operate the inverter circuit 38 in short pulses at a frequency that is much higher then the lamp preheating frequency. The inductor in the resonant output circuit, or resonant tank, prevents current from flowing to the lamp because of the higher frequency of the inverter circuit 38. The charge pump input capacitor, on the other hand, allows sufficient power to pass through to the charge pump to allow the inverter power supply circuit to operate properly. Thus, even when the inverter circuit 38 runs only in short pulses, there is enough power provided through this charge pump to maintain the power supply for the microcontroller 40.

In both of the approaches described above that require the inverter circuit 38 to operate at a switching frequency that is much higher than normal, the switching frequency is limited by the parameters of the inverter circuit 38. In each case, the resonant tank circuit should be designed to provide enough attenuation to avoid electric shock at the lamp output and the switching device should be able to operate at a high frequency with acceptable losses on the inverter switches 84, 86.

Thus, although there have been described particular embodiments of the present invention of a new and useful Power Supply Circuits And Methods For Supplying Stable Power To Control Circuitry In An Electronic Ballast, it is not intended that such references be construed as limitations upon the scope of this invention except as set forth in the following claims.

We claim:

1. A electronic ballast control circuit, comprising:
a first resistor connected in series with a first electronic switch, the first resistor including a first end and a second end, the first electronic switch including a first terminal and a second terminal;
a voltage limiter having a first end connected directly to the first terminal of the first electronic switch and a second end connected directly to the second terminal of the first electronic switch;
a second resistor connected in series with the voltage limiter and having a first end connected directly to the first terminal of the first electronic switch and a second end connected directly to the first end of the first resistor; and
a third resistor connected in series with a second electronic switch to form a series combination, the third resistor having a first end and a second end, the second electronic switch having a first terminal and a second terminal; and
wherein the first end of the third resistor is connected directly to the first terminal of the first electronic switch, the second end of the third resistor is connected directly to the first terminal of the second electronic switch, and the second terminal of the second electronic switch is connected directly to the second end of the voltage limiter.

2. The circuit of claim 1, wherein:
the second electronic switch includes a third terminal; and
the circuit further includes a voltage divider connected directly to the third terminal of the second electronic switch.

3. The circuit of claim 2, wherein:
the first and second electronic switches are transistors; and
the voltage limiter is a Zener diode.

4. The circuit of claim 3, wherein:
the first electronic switch is a field effect transistor (FET); and
the second electronic switch is a bipolar junction transistor (BJT).

5. The circuit of claim 4, wherein:
the FET includes a gate terminal and a source terminal; and
the first terminal of the first electronic switch is the gate terminal of the FET and the second terminal of the first electronic switch is the source terminal of the FET.

6. The circuit of claim 5, wherein the BJT includes a base terminal; and
the third terminal of the second electronic switch is the base terminal of the BJT.

7. The circuit of claim 6, wherein:
the voltage divider includes a fourth and fifth resistor connected in series at a junction point; and
the junction point is connected directly to the base terminal of the BJT.

8. An electronic ballast, comprising:
a high voltage power rail;
an auxiliary power supply rail;
a first resistor connected in series with a first electronic switch between the high voltage power rail and the auxiliary power supply rail, the first electronic switch is operable to provide power from the high voltage power rail to the auxiliary power supply rail when a state of a lamp coupled to the ballast changes;
the first electronic switch includes a pair of first switch terminals;
the ballast includes a voltage limiter connected to the pair of first switch terminals.
a second resistor connected in series with the voltage limiter and having a first end connected to one of the first switch terminals and a second end connected to the first resistor; and
a third resistor connected in series with a second electronic switch to form a series combination and wherein the series combination is connected in parallel with the voltage limiter.

9. The ballast of claim 8, wherein:
the second electronic switch includes a second switch terminal; and
the ballast further includes a voltage divider connected to the second switch terminal.

10. A method of supplying stable power to control circuitry in an electronic ballast, comprising the steps of:
sensing when an inverter circuit in the electronic ballast stops loading a PFC circuit in the electronic ballast as a result of a change in a condition of a lamp coupled to the ballast and, in response, loading the PFC circuit so that the PFC circuit supplies an operating power supply circuit in the electronic ballast with sufficient power to supply the control circuitry with stable operating power; and
sensing when the inverter circuit begins loading the PFC circuit again and, in response, unloading the PFC circuit.

11. The method of claim 10, wherein:
the step of loading the PFC circuit includes the step of connecting a load resistor to the PFC circuit; and
the step of unloading the PFC circuit includes the step of disconnecting the load resistor from the PFC circuit.

12. The method of claim 11, wherein:
  the step of connecting the load resistor to the PFC circuit includes the step of turning on a transistor; and
  the step of disconnecting the load resistor from the PFC circuit includes the step of turning off the transistor.

13. The method of claim 10, wherein the steps of loading and unloading the PFC circuit are implemented using a microcontroller.

14. The method of claim 10, wherein the step of loading the PFC circuit includes the step of operating inverter switches in an inverter circuit connected to the PFC circuit at a switching frequency that causes switching losses in the inverter switches to develop and load the PFC circuit.

15. The method of claim 14, wherein the step of operating the inverter switches at a switching frequency that causes switching losses includes the step of operating the inverter switches at a switching frequency that prevents the inverter circuit from creating an electric shock hazard at a lamp output of the electronic ballast.

16. The method of claim 15, wherein the step of operating the inverter switches at a switching frequency that prevents the inverter circuit from creating an electric shock hazard at a lamp output of the electronic ballast includes the step of operating the inverter switches at a switching frequency that prevents the inverter circuit from supplying sufficient current to the lamp output of the electronic ballast to create an electric shock hazard.

17. An electronic ballast control circuit that can be used to control an electronic ballast so that an operating power supply circuit in the electronic ballast supplies stable operating power to control circuitry in the electronic ballast, comprising:
  a microcontroller adapted to be connected to the operating power supply circuit and an inverter circuit in the electronic ballast, the microcontroller being further adapted to sense when a lamp connected to the electronic ballast stops loading the inverter circuit and, in response, to load the inverter circuit in a manner that causes the inverter circuit to supply the operating power supply circuit with sufficient power to supply the control circuitry with stable operating power and that prevents the inverter circuit from supplying a lamp output included with the electronic ballast with sufficient power to create an electric shock hazard to humans;
  the microcontroller being still further adapted to sense when the lamp begins loading the inverter circuit again and, in response, to unload the inverter circuit.

18. The circuit of claim 17, wherein the microcontroller is adapted to sense when the lamp stops loading the inverter circuit by sensing when a reference voltage in the operating power supply circuit drops below a reference voltage level generated when the lamp is loading the inverter circuit.

19. The circuit of claim 17, wherein the microcontroller is adapted to load the inverter circuit by operating the inverter circuit at an inverter switching frequency that causes the inverter circuit to supply the operating power supply circuit with sufficient power to prevent the stable operating power from becoming unstable and that prevents the inverter circuit from supplying the lamp output with sufficient power to create an electric shock hazard to humans.

20. The circuit of claim 17, wherein the microcontroller is adapted to sense when the lamp begins loading the inverter circuit again by sensing when a reference voltage in the operating power supply circuit rises above a reference voltage level generated when the lamp is loading the inverter circuit.

21. A method of supplying stable operating power to control circuitry in an electronic ballast, comprising the steps of:
  sensing when a lamp connected to the electronic ballast stops loading an inverter circuit included in the electronic ballast and, in response, loading the inverter circuit in a manner that causes the inverter circuit to supply an operating power supply circuit in the electronic ballast with sufficient power to supply the control circuitry with stable operating power and that prevents the inverter circuit from supplying a lamp output included with the electronic ballast with sufficient power to create an electric shock hazard to humans; and
  sensing when the lamp begins loading the inverter circuit again and, in response, unloading the inverter circuit.

22. The method of claim 21, wherein the step of sensing when the lamp stops loading the inverter circuit includes the step of sensing when a reference voltage in the operating power supply circuit drops below a reference voltage level generated when the lamp is loading the inverter circuit.

23. The method of claim 21, wherein the step of loading the inverter circuit includes the step of operating the inverter circuit at an inverter switching frequency that causes the inverter circuit to supply the operating power supply circuit with sufficient power to prevent the stable operating power from becoming unstable and that prevents the inverter circuit from supplying the lamp output with sufficient power to create an electric shock hazard to humans.

24. The method of claim 21, wherein the step of sensing when the lamp begins loading the inverter circuit again includes the step of sensing when a reference voltage in the operating power supply circuit rises above a reference voltage level generated when the lamp is loading the inverter circuit.

* * * * *